(12) United States Patent
Miyazaki et al.

(10) Patent No.: US 10,005,521 B2
(45) Date of Patent: Jun. 26, 2018

(54) BICYCLE COMPONENT OPERATING DEVICE

(71) Applicant: Shimano Inc., Sakai, Osaka (JP)

(72) Inventors: Kentaro Miyazaki, Osaka (JP); Kazutaka Fukao, Osaka (JP); Tsuyoshi Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 0 days. days.

(21) Appl. No.: 15/351,041

(22) Filed: Nov. 14, 2016

(65) Prior Publication Data

US 2018/0134342 A1  May 17, 2018

(51) Int. Cl.
*B62M 25/04* (2006.01)

(52) U.S. Cl.
CPC .................... *B62M 25/04* (2013.01)

(58) Field of Classification Search
CPC ....................................................... B62M 25/04
See application file for complete search history.

(56) References Cited

U.S. PATENT DOCUMENTS

| | | | |
|---|---|---|---|
| 6,691,591 B2 * | 2/2004 | Tsumiyama | ........... B62K 23/04 74/489 |
| 7,152,497 B2 | 12/2006 | Sato et al. | |
| 7,779,718 B2 * | 8/2010 | Jordan | .................... B62M 25/04 74/489 |
| 7,802,489 B2 | 9/2010 | Tsumiyama | |
| 7,849,765 B2 * | 12/2010 | Kawakami | ............. B62M 25/04 74/473.14 |
| 8,181,553 B2 | 5/2012 | Tsumiyama | |
| 8,485,060 B2 | 7/2013 | Emura et al. | |
| 8,528,442 B2 | 9/2013 | Kawakami | |
| 8,661,932 B2 | 3/2014 | Liao | |
| 2010/0288070 A1 | 11/2010 | Fukao | |
| 2015/0210342 A1 | 7/2015 | Fukao et al. | |
| 2015/0259024 A1 | 9/2015 | Kawakami | |

* cited by examiner

*Primary Examiner* — Thomas C Diaz
(74) *Attorney, Agent, or Firm* — Global IP Counselors, LLP

(57) ABSTRACT

A bicycle component operating device has a base member, an operating member, a positioning ratchet member, a pulling pawl, a positioning pawl, a release member and a releasing pawl. The positioning ratchet member is rotatably mounted to the base member. The pulling pawl rotates the positioning ratchet member in a first rotational direction in response to a pulling operation of the operating member. The positioning pawl prevents rotation of the positioning ratchet member in the second rotational direction while the positioning pawl is in a holding position. The positioning pawl releases the positioning ratchet member for rotation in the second rotational direction while the positioning pawl is in a releasing position. The releasing pawl moves the release member in response to a releasing operation of the operating member. The release member moves the positioning pawl from the holding position to the releasing position in response to the releasing operation.

15 Claims, 8 Drawing Sheets

BICYCLE COMPONENT OPERATING DEVICE

BACKGROUND

Field of the Invention

This invention generally relates to a bicycle component operating device. More specifically, the present invention relates to a bicycle component operating device for operating a bicycle component between at least two positions with an operating member.

Background Information

Bicycles are often provided with one or more bicycle components that can be operated and/or adjusted by a rider while riding. Examples of some these bicycle components include a gear changing device (e.g., a derailleur or an internally geared hub), a suspension and a seatpost. A bicycle component operating device is usually provided on a bicycle (e.g., on a bicycle handlebar) for a rider to operate and/or adjust these bicycle components. The bicycle component operating device is often connected to the bicycle component with, for example, a Bowden-type control cable. Some bicycle components are moved between two or more positions. For example, a gearshift operating device (bicycle shifter) is one example of a bicycle component operating device that is provided with a positioning unit for establishing speed stages for a gear changing device.

SUMMARY

Generally, the present disclosure is directed to various features of a bicycle component operating device. One aspect disclosed in the present disclosure is to provide a bicycle component operating device that is capable of pulling and releasing by movement of one operating member in same direction.

In view of the state of the known technology and in accordance with a first aspect of the present disclosure, a bicycle component operating device is basically provided that comprises a base member, an operating member, a positioning ratchet member, a pulling pawl, a positioning pawl, a release member and a releasing pawl. The operating member is movably mounted with respect to the base member from a rest position toward an operated position. The positioning ratchet member is rotatably mounted with respect to the base member about a pivot axis between a first position and a second position. The positioning ratchet member is configured to rotate in a first direction and a second direction that is opposite to the first direction. The pulling pawl is movably mounted on the operating member to move therewith. The pulling pawl is configured to rotate the positioning ratchet member in the first direction about the pivot axis in response to a pulling operation of the operating member from the rest position toward the operated position while the positioning ratchet member is in the first position. The positioning pawl is movably mounted with respect to the base member between a holding position and a releasing position. The positioning pawl prevents rotation of the positioning ratchet member in the second direction about the pivot axis while the positioning pawl is in the holding position. The positioning pawl releases the positioning ratchet member for rotation in the second direction while the positioning pawl is in the releasing position. The release member is movably mounted with respect to the base member. The releasing pawl is movably mounted on the operating member to move therewith. The releasing pawl is configured to move the release member in response to a releasing operation of the operating member from the rest position toward the operated position while the positioning ratchet member is in the second position. The release member moves the positioning pawl from the holding position to the releasing position in response to the releasing operation.

Advantageously according to the first aspect of the present invention, the bicycle component operating device is configured such that it is possible to pull and release by movement of one operating member in same direction.

In accordance with a second aspect of the present invention, the bicycle component operating device according to the first aspect is configured so that the pulling pawl is different from the releasing pawl.

Advantageously according to the second aspect of the present invention, the bicycle component operating device is configured such that it is possible to pull and release by movement of one operating member in same direction.

In accordance with a third aspect of the present invention, the bicycle component operating device according to the first or second aspect is configured so that the operating member is pivotally mounted with respect to the base member about the pivot axis. The pulling pawl is configured to rotate the positioning ratchet member in the first direction about the pivot axis in response to the pulling operation of the operating member in the first direction while the positioning ratchet member is in the first position. The releasing pawl is configured to rotate the release member in the first direction about the pivot axis in response to the releasing operation of the operating member in the first direction while the positioning ratchet member is in the second position.

Advantageously according to the third aspect of the present invention, the bicycle component operating device is configured such that it is possible to make the bicycle component operating device compact.

In accordance with a fourth aspect of the present invention, the bicycle component operating device according to any one of the first to third aspects is configured so that the positioning ratchet member prevents the releasing pawl from rotating the release member while the positioning ratchet member is in the first position, and so that the positioning ratchet member prevents the pulling pawl from rotating the positioning ratchet member while the positioning ratchet member is in the second position.

Advantageously according to the fourth aspect of the present invention, the bicycle component operating device is configured such that it is possible to achieve more reliable operation.

In accordance with a fifth aspect of the present invention, the bicycle component operating device according to any one of the first to fourth aspects is configured so that the positioning ratchet member includes an inner wire connection structure.

Advantageously according to the fifth aspect of the present invention, the bicycle component operating device is configured such that it is possible to pull and release an inner wire when the inner wire is attached to the inner wire connection structure.

In accordance with a sixth aspect of the present invention, the bicycle component operating device according to any one of the first to fifth aspects is configured so that the pulling pawl is pivotally mounted on the operating member about a pawl pivot axis.

Advantageously according to the sixth aspect of the present invention, the bicycle component operating device is configured such that it is possible to easily manufacture the pulling pawl.

In accordance with a seventh aspect of the present invention, the bicycle component operating device according to the sixth aspect is configured so that the releasing pawl is pivotally mounted on the operating member about the pawl pivot axis.

Advantageously according to the seventh aspect of the present invention, the bicycle component operating device is configured such that it is possible to make the bicycle component operating device relatively compact.

In accordance with an eighth aspect of the present invention, the bicycle component operating device according to any one of the first to seventh aspects is configured so that the pulling pawl is biased towards engagement with the positioning ratchet member, and the releasing pawl is biased towards the engagement with the release member.

Advantageously according to the eighth aspect of the present invention, the bicycle component operating device is configured such that it is possible to achieve more reliable operation.

In accordance with a ninth aspect of the present invention, the bicycle component operating device according to the eighth aspect further comprises a biasing element having a first free end operatively coupled to the releasing pawl, and a second free end is operatively coupled to the pulling pawl to bias the releasing pawl towards the release member.

Advantageously according to the ninth aspect of the present invention, the bicycle component operating device is configured such that the releasing pawl reliably engages the release member during a releasing operation.

In accordance with a tenth aspect of the present invention, the bicycle component operating device according to the eighth aspect is configured so that the pulling pawl includes a cam surface that holds the releasing pawl out of engagement with the release member while the operating member is in the rest position and the positioning ratchet member is in the first position, and so that the releasing pawl is disposed in a rotational path of the release member while the operating member is in the rest position and the positioning ratchet member is in the second position.

Advantageously according to the tenth aspect of the present invention, the bicycle component operating device is configured such that it is possible to make the bicycle component operating device relatively compact.

In accordance with an eleventh aspect of the present invention, the bicycle component operating device according to any one of the first to tenth aspects is configured so that the positioning ratchet member includes at least one pulling abutment that is engaged by the pulling pawl during the pulling operation in which the operating member and the positioning ratchet member are moved together in the first direction.

Advantageously according to the eleventh aspect of the present invention, the bicycle component operating device is configured such that it is possible to achieve more reliable operation.

In accordance with a twelfth aspect of the present invention, the bicycle component operating device according to any one of the first to eleventh aspects is configured so that the positioning ratchet member is biased toward the second direction and so that the positioning ratchet member includes at least one positioning abutment that is engaged by the positioning pawl while the operating member is in the rest position and the positioning ratchet member is in the second position.

Advantageously according to the twelfth aspect of the present invention, the bicycle component operating device is configured such that it is possible to achieve more reliable positioning of the positioning ratchet member.

In accordance with a thirteenth aspect of the present invention, the bicycle component operating device according to any one of the first to twelfth aspects is configured so that the positioning ratchet member and the release member are plates that are rotatably mounted about the pivot axis.

Advantageously according to the thirteenth aspect of the present invention, the bicycle component operating device is configured such that it is possible to make the bicycle component operating device relatively compact.

In accordance with a fourteenth aspect of the present invention, the bicycle component operating device according to any one of the first to thirteenth aspects is configured so that the release member includes an abutment that is engaged by the releasing pawl as the operating member moves from the rest position towards the operated position while the positioning ratchet member is in the second position.

Advantageously according to the fourteenth aspect of the present invention, the bicycle component operating device is configured such that it is possible to achieve more reliable operation.

In accordance with a fifteenth aspect of the present invention, the bicycle component operating device according to any one of the first to fourteenth is configured so that the release member includes a cam surface that moves the positioning pawl from the holding position to the releasing position as the operating member moves from the rest position toward the operated position while the positioning ratchet member is in the second position.

Advantageously according to the fifteenth aspect of the present invention, the bicycle component operating device is configured such that it is possible to achieve more reliable operation.

Also other objects, features, aspects and advantages of the disclosed bicycle component operating device will become apparent to those skilled in the art from the following detailed description, which, taken in conjunction with the annexed drawings, discloses one illustrative embodiment of the bicycle component operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
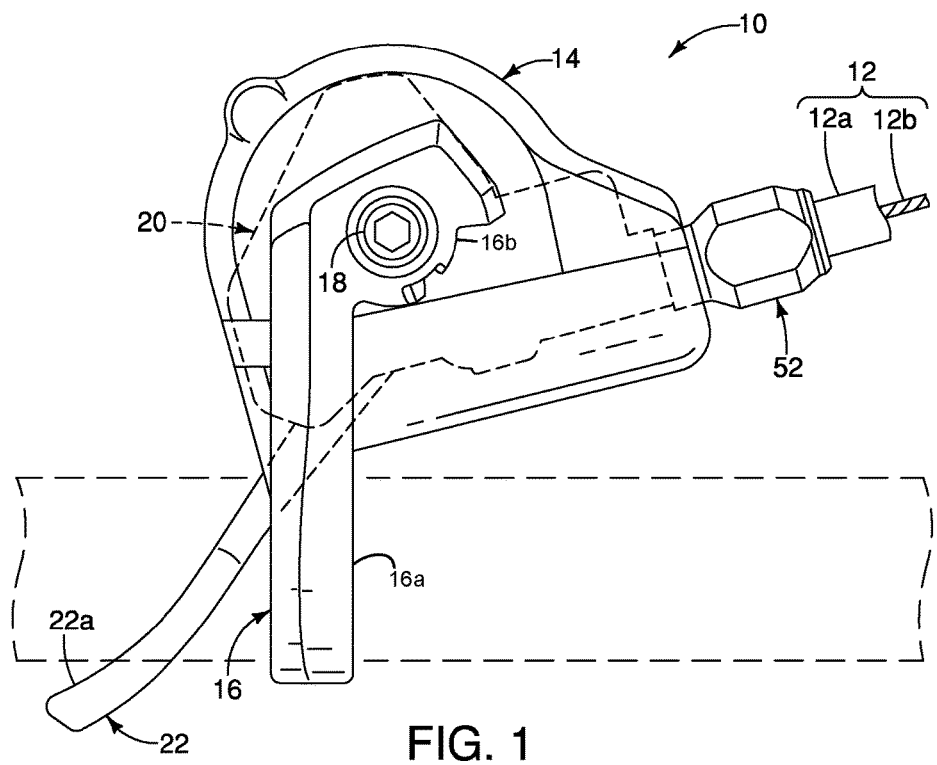
FIG. 1 is a top view of a left end of a bicycle handlebar that is equipped with a bicycle component operating device in accordance with one illustrated embodiment.
Figure 2:
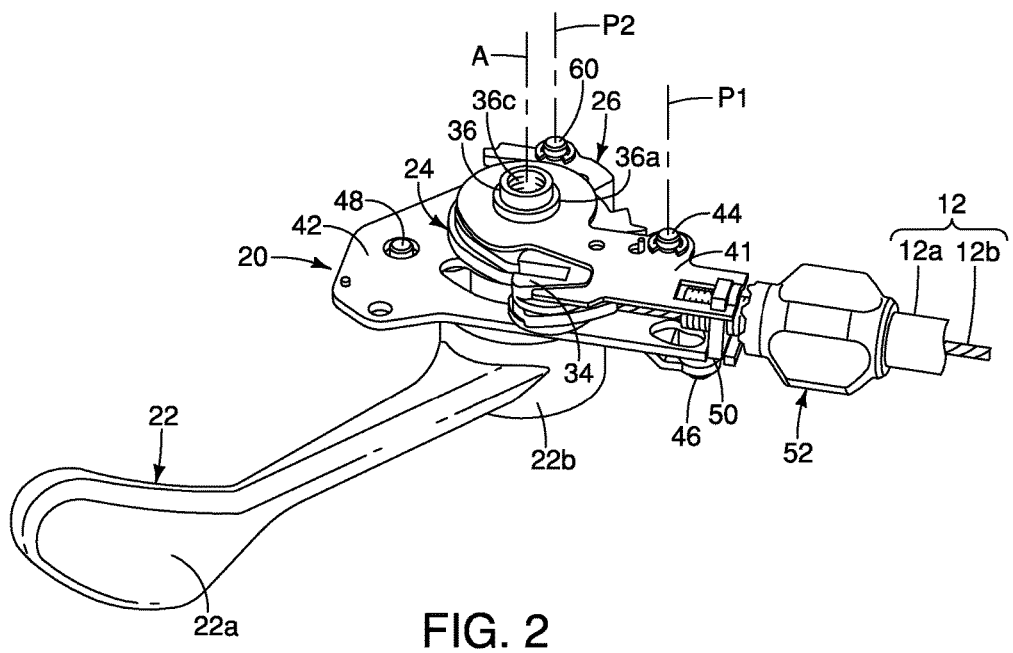
FIG. 2 is a perspective view of the bicycle component operating device illustrated in FIG. 1 in which a housing and handlebar clamp of the bicycle component operating device has been removed to reveal internal parts of the bicycle component operating device.
Figure 3:
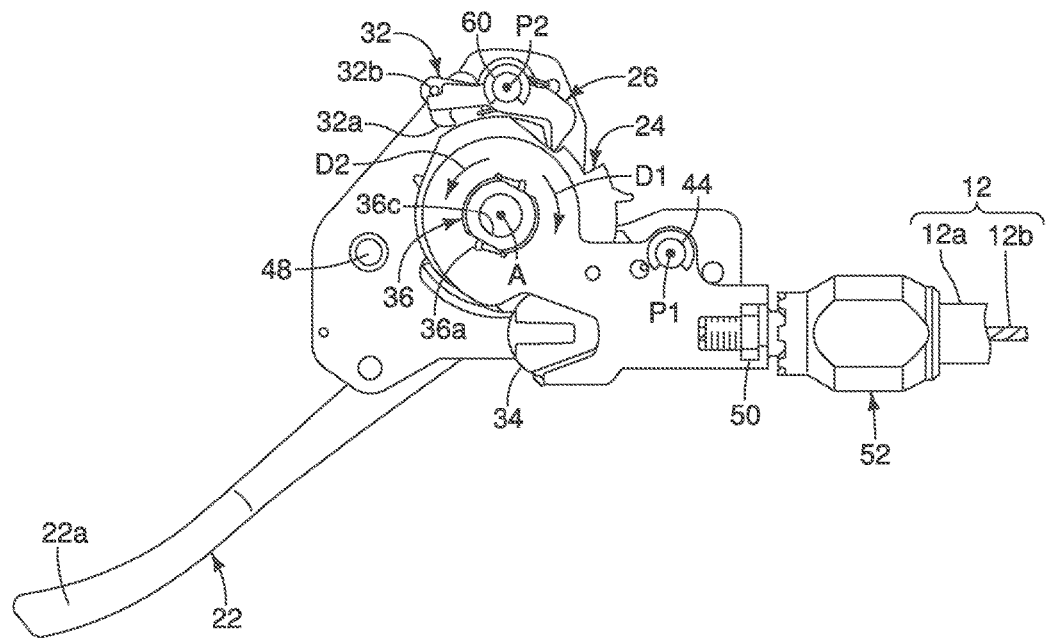
FIG. 3 is a top plan view of the internal parts of the bicycle component operating device that are illustrated in FIG. 2.
Figure 4:
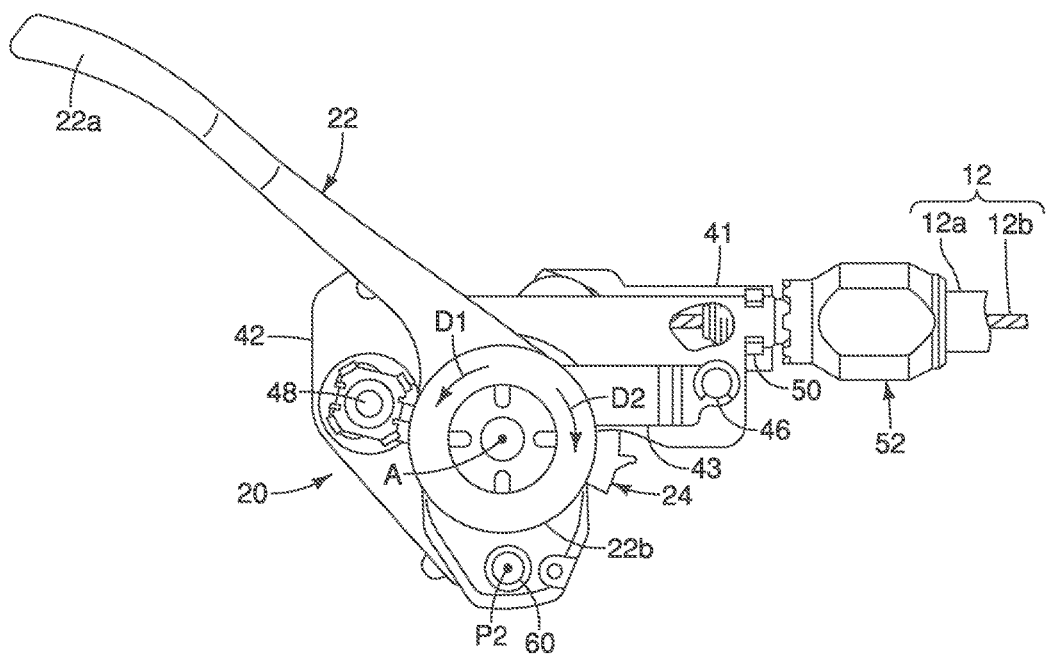
FIG. 4 is a bottom plan view of the internal parts of the bicycle component operating device that are illustrated in FIGS. 2 and 3.

Referring initially to FIG. 1, a bicycle component operating device 10 is illustrated in accordance with a first embodiment. Here, the bicycle component operating device 10 is configured to be mounted to a left side of a handlebar H so as to be operated by rider's left hand. In the illustrated embodiment, the bicycle component operating device 10 is configured to be operatively coupled to a bicycle component (not shown) via a control cable 12. In the illustrated embodiment, the bicycle component operating device 10 is configured as a shifter for controlling a gear position of a front gear changing device such as a derailleur or an internally geared hub. However, the bicycle component operating device 10 can be configured as a bicycle control device for operating other types of bicycle components (e.g., suspension devices) as needed and/or desired.

Preferably, as seen in FIG. 1, the control cable 12 is a conventional bicycle operating cable that has an outer case 12a covering an inner wire 12b. In other words, the control cable 12 is a Bowden type cable in which the inner wire 12b is slidably received within the outer case 12a. The bicycle component operating device 10 operates the bicycle component (not shown) by selectively pulling and releasing the inner wire 12b.

As seen in FIG. 1, the bicycle component operating device 10 comprises a housing 14 and a handlebar clamp 16. Here, the housing 14 and the handlebar clamp 16 are separate members that are attached together. However, the handlebar clamp 16 can be integrally formed with a part of the housing 14 as a one-piece member as needed and/or desired. Also, the handlebar clamp 16 can be adjustably mounted to the housing 14 as needed and/or desired.

The housing 14 (FIG. 1) covers the internal parts (see FIGS. 2 to 7) of the bicycle component operating device 10 that release the inner wire 12b out of the housing 14 and that pull the inner wire 12b into the housing 14. Here, for example, the housing 14 has a two-piece construction (i.e., upper and lower housing parts) that is fastened together by a plurality of screws (not shown). The housing parts are hard rigid members constructed of a suitable material such as a hard plastic or a lightweight metal. However, the housing 14 can have a variety of configurations as needed and/or desired.

The handlebar clamp 16 is constructed of a hard rigid material such as a hard plastic or a lightweight metal. The handlebar clamp 16 includes a clamp portion 16a and an attachment portion 16b. The clamp portion 16a is a conventional tube clamp that constitutes an example of a handlebar mounting member. Here, the clamp portion 16a is provided with a tightening bolt (not shown) that is configured to squeeze the handlebar clamp 16 onto the handlebar H. The handlebar clamp 16 is fixed to the internal parts of the bicycle component operating device 10 by a fixing bolt 18 (FIG. 1) as discussed below.

As seen in FIGS. 2 to 7, the internal parts of the bicycle component operating device 10 comprises a base member 20, an operating member 22, a positioning ratchet member 24, a pulling pawl 26, a positioning pawl 28, a release member 30 and a releasing pawl 32. The positioning ratchet member 24 includes an inner wire connection structure 34 for attaching the inner wire 12b to the positioning ratchet member 24. The bicycle component operating device 10 further comprises a main axle 36 that defines a pivot axis A. Here, the main axle 36 is a mounting bolt that has a head portion 36a, an externally threaded shaft portion 36b and an internally threaded bore 36c. A fixing nut 38 is screwed onto the externally threaded shaft portion 36b of the main axle 36 for pivotally supporting the operating member 22 to the base member 20. The fixing bolt 18 is threaded into the internally threaded bore 36c of the main axle 36 for securing the handlebar clamp 16 to the main axle 36.

The base member 20 basically comprises a first or upper support 41, a second or intermediate support 42 and a third or lower support 43. In the illustrated embodiment, for example, the first, second and third supports 41 to 43 are rigid plate members that are constructed from metal plates. The first, second and third supports 41 to 43 are interconnected to form an internal frame or support structure for supporting the positioning ratchet member 24, the positioning pawl 28 and the release member 30. Basically, the first, second and third supports 41 to 43 are fixed together by the main axle 36 and the fixing nut 38. However, a first support pin 44 is disposed and fixed between the first and second supports 41 and 42 for supporting and spacing the first and second supports 41 and 42 with respect to each other. Also a second support pin 46 and a third support pin 48 are disposed and fixed between the second and third supports 42 and 43 for supporting and spacing the second and third supports 42 and 43 with respect to each other. Moreover, a nut plate 50 is mounted between the first and second supports 41 and 42 for adjustably coupling a barrel adjuster 52 to the base member 20. The barrel adjuster 52 is adjustably coupled to the base member 20 to variably fix a contact point of an end of the outer case 12*a* relative to the base member 20.

Figure 12:
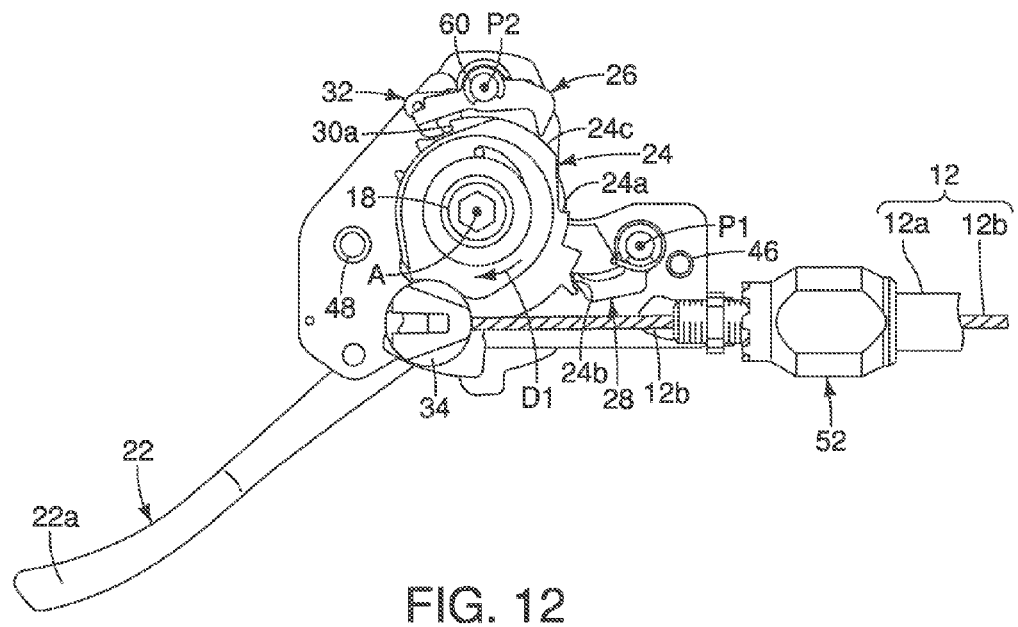
FIG. 12 is a top plan view, similar to FIGS. 8 and 10, of selected internal parts of the bicycle component operating device of the illustrated embodiment, but in which the internal parts are shown in their rest positions and the positioning ratchet member in a second position that corresponds to a fully wound position of the positioning ratchet member.
Figure 13:
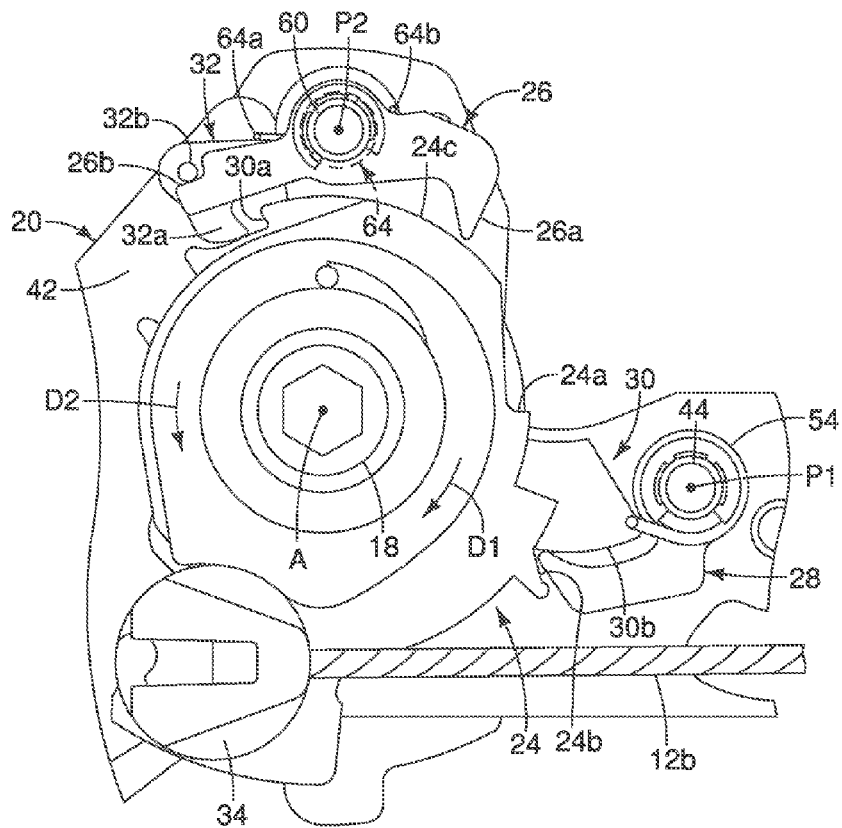
FIG. 13 is an enlarged, partial top plan view of the selected internal parts of the bicycle component operating device illustrated in FIG. 12.

Basically, the positioning ratchet member 24 and the positioning pawl 28 form a position maintaining mechanism 40 that holds the inner wire 12*b* at a plurality of predetermined positions with respect to the base member 20. While the positioning ratchet member 24 only has two predetermined positions, the position maintaining mechanism 40 could be configured with more predetermined positions if needed and/or desired. The positioning ratchet member 24 is configured to rotate in a first direction D1 and a second direction D2 that is opposite to the first direction D1. More specifically, the positioning ratchet member 24 is rotatably mounted with respect to the base member 20 about the pivot axis A between a first position and a second position. Thus, the positioning ratchet member 24 is rotatably mounted on the main axle 36. The first position of the positioning ratchet member 24 corresponds to a fully released position as shown in FIGS. 3, 4, 8 and 9. The second position of the positioning ratchet member 24 corresponds to a fully wound position as shown in FIGS. 12 and 13. The positioning ratchet member 24 is moved between the first and second positions in response to a user operating the operating member 22.

The positioning pawl 28 is movably mounted with respect to the base member 20 between a holding position and a releasing position. In the illustrated embodiment, the positioning pawl 28 is pivotally mounted on the first support pin 44 that defines a pawl pivot axis P1. A biasing element 54 is provided on the first support pin 44 for biasing the positioning pawl 28 towards engagement with the positioning ratchet member 24. The biasing element 54 is a torsion spring that has a coiled portion disposed around the first support pin 44. A first free end of the biasing element 54 is operatively coupled to the positioning pawl 28, while a second free end of the biasing element 54 is operatively coupled to the first support 41. The positioning pawl 28 prevents rotation of the positioning ratchet member 24 in the second direction D2 about the pivot axis A while the positioning pawl 28 is in the holding position. The positioning pawl 28 releases the positioning ratchet member 24 for rotation in the second direction D2 while the positioning pawl 28 is in the releasing position.

Preferably, the position maintaining mechanism 40 further comprises a biasing element 56 (see FIG. 7) that is arranged to bias the positioning ratchet member 24 towards the fully released position as shown in FIGS. 3, 4, 8 and 9. In other words, the biasing element 56 is provided for biasing the positioning ratchet member 24 towards the second direction D2 about the pivot axis A. In this way, the positioning ratchet member 24 is biased toward the second direction D2. The second direction D2 corresponds to a wire releasing direction in which the inner wire 12*b* is payed out of the housing 14. When the positioning pawl 28 is disengaged from the positioning ratchet member 24 during a releasing operation, the positioning ratchet member 24 rotates in the second direction D2 about the pivot axis A. In the illustrated embodiment, the biasing element 56 is a flat torsion spring that is coiled around the main axle 36.

Preferably, the operating member 22 is an operating lever that has a user operating portion 22*a* and a mounting portion 22*b*. As mentioned above, the operating member 22 is mounted to the base member 20 by the main axle 36 and the fixing nut 38. Thus, the operating member 22 is movably mounted with respect to the base member 20 from a rest position toward an operated position. Preferably, the operating member 22 is biased towards the rest position such that the operating member 22 is a trigger lever. The term "rest position" as used herein refers to a state in which the part (e.g., the operating member 22) remains stationary without the need of a user holding the part in that state corresponding to the rest position. In the illustrated embodiment, a biasing element 58 is provided for biasing the operating member 22 towards the rest position. In the illustrated embodiment, the biasing element 58 is a torsion spring that is coiled around the main axle 36. A first free end of the biasing element 58 is operatively coupled to the operating member 22, while a second free end of the biasing element 58 is operatively coupled to the third support 43 of the base member 20. In this way, when the operating member 22 is released after being moved from the rest position to the operated position, the operating member 22 automatically returns to the rest position once the operating member 22 is released by the user.

In the illustrated embodiment, the operating member 22 is pivotally mounted with respect to the base member 20 about the pivot axis A. In the illustrated embodiment, the pulling pawl 26 is movably mounted on the operating member 22 to move therewith. Also in the illustrated embodiment, the releasing pawl 32 is movably mounted on the operating member 22 to move therewith. In this way, the operating member 22 is used for both pulling the inner wire 12*b* by rotating the positioning ratchet member 24 in the first direction D1 and releasing the inner wire 12*b* by rotating the positioning ratchet member 24 in the second direction D2. In other words, when the operating member 22 is moved from the rest position towards the operated position, the positioning ratchet member 24 is moved between the first and second positions.

Figure 5:
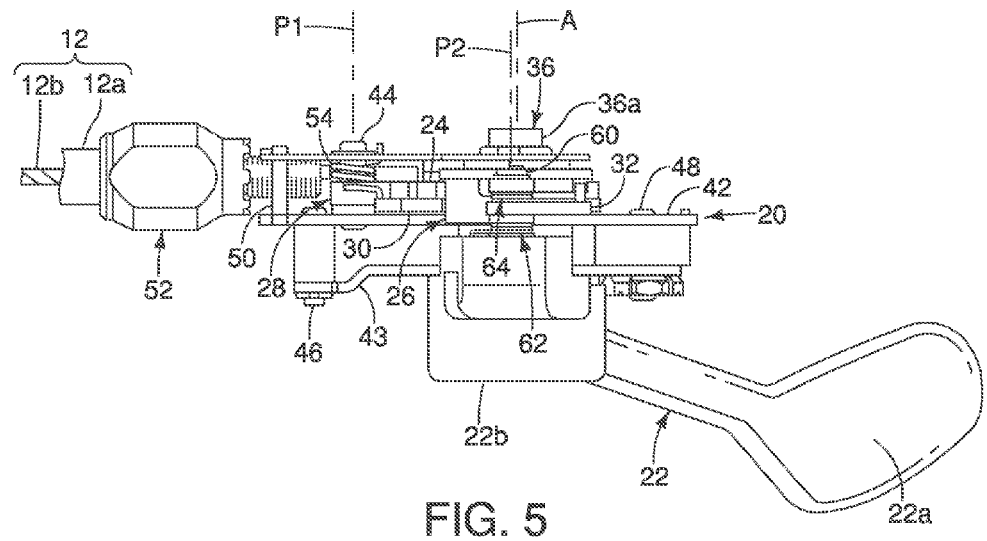
FIG. 5 is a side elevational plan view of the internal parts of the bicycle component operating device that are illustrated in FIGS. 2 to 4.
Figure 6:
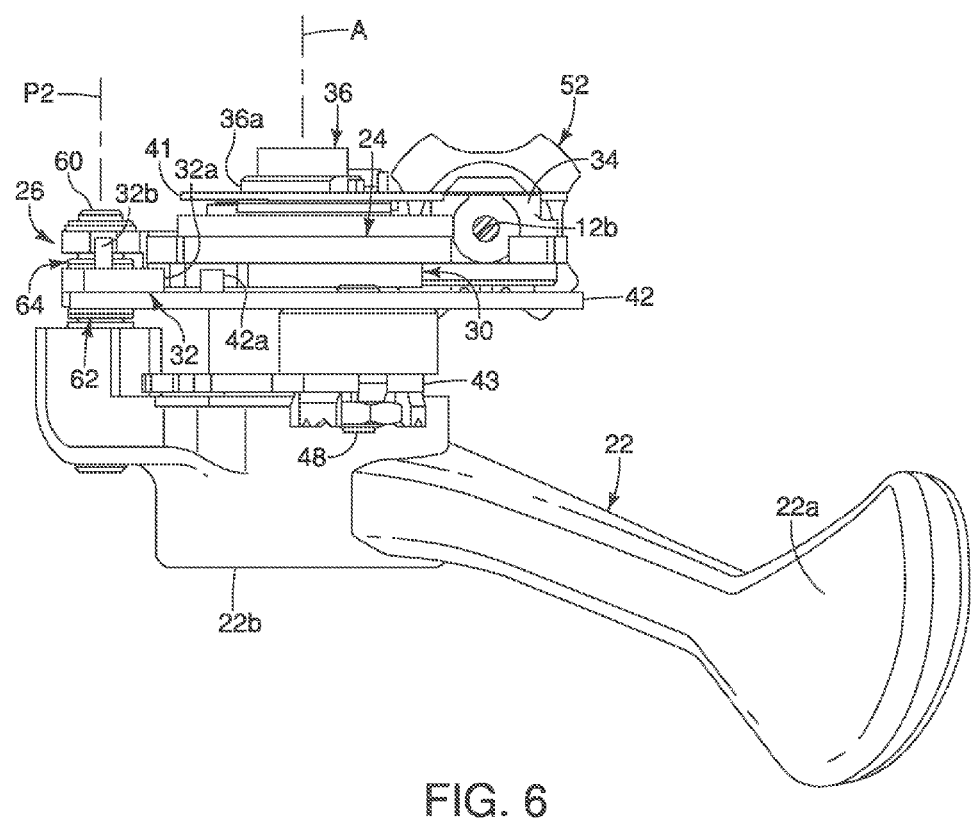
FIG. 6 is another side elevational plan view of the internal parts of the bicycle component operating device that are illustrated in FIGS. 2 to 5.
Figure 7:
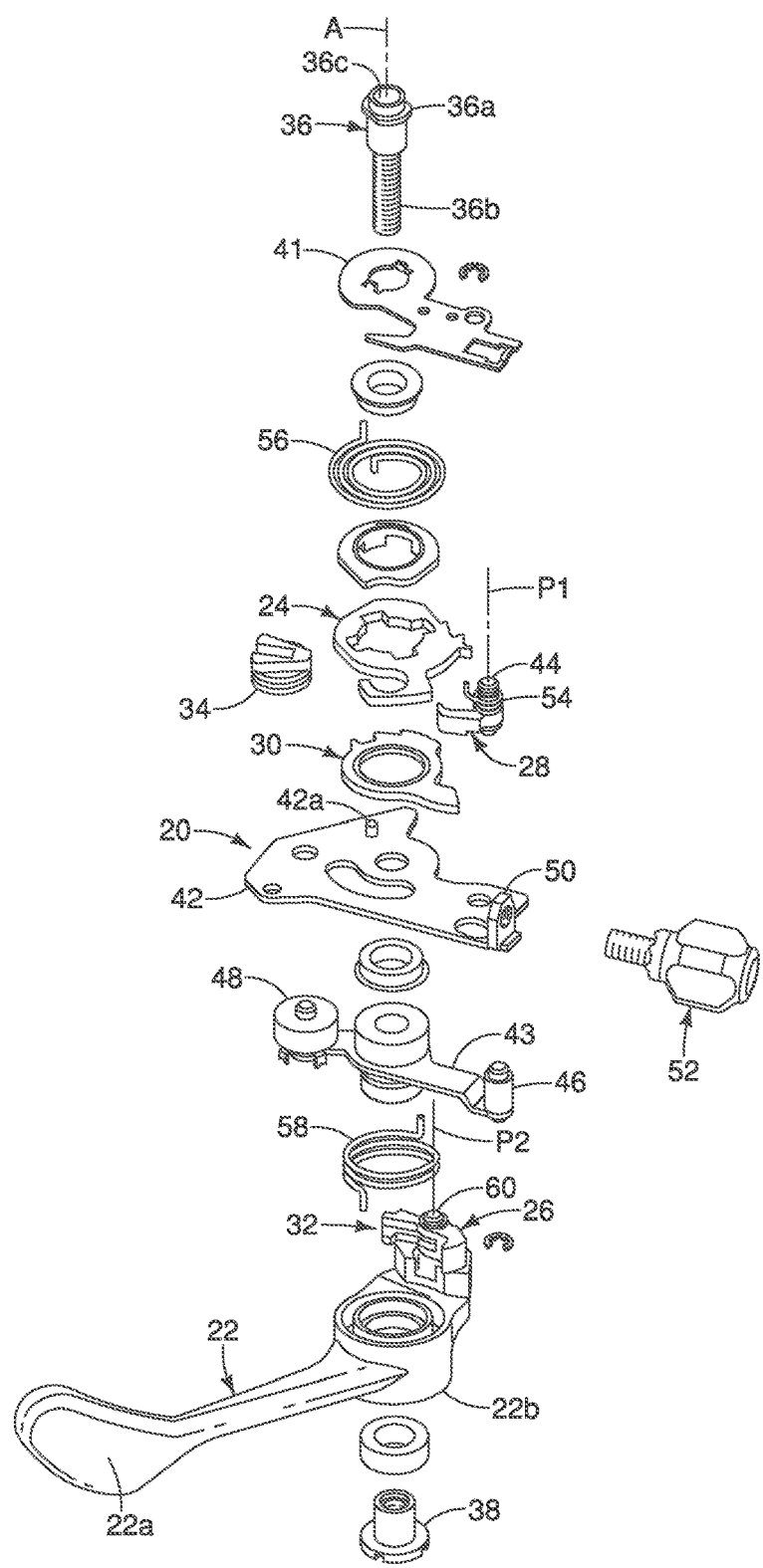
FIG. 7 is an exploded perspective view of the selected internal parts of the bicycle component operating device illustrated in FIGS. 2 to 6.

Specifically, as seen in FIGS. 5 and 6, the pulling pawl 26 is pivotally mounted on the operating member 22 about a pawl pivot axis P2. More specifically, a pivot pin 60 is fixed to the operating member 22 to define the pawl pivot axis P2. The pulling pawl 26 is pivotally supported on the pivot pin 60. The pulling pawl 26 is biased towards engagement with the positioning ratchet member 24. In the illustrated embodiment, a biasing element 62 is provided for biasing the pulling pawl 26 towards engagement with the positioning ratchet member 24. The biasing element 62 is a torsion spring that has a coiled portion disposed around the pivot pin 60. A first free end of the biasing element 62 is operatively coupled to the pulling pawl 26, while a second free end of the biasing element 62 is operatively coupled to the operating member 22. The pulling pawl 26 is configured to rotate the positioning ratchet member 24 in the first direction D1 about the pivot axis A in response to a pulling operation of the operating member 22 from the rest position toward the operated position while the positioning ratchet member 24 is in the first position. Stated differently, the pulling pawl 26 is configured to rotate the positioning ratchet member 24 in the first direction D1 about the pivot axis A in response to the pulling operation of the operating member 22 in the first direction D1 while the positioning ratchet member 24 is in the first position.

The releasing pawl 32 is configured to rotate the release member 30 in the first direction D1 about the pivot axis A in response to the releasing operation of the operating member 22 in the first direction D1 when the positioning ratchet member 24 is in the second position. As explained below, the releasing pawl 32 is configured to move the release member 30 in response to a releasing operation of the operating member 22 from the rest position toward the operated position while the positioning ratchet member 24 is in the second position. The release member 30 moves the positioning pawl 28 from the holding position to the releasing position in response to the releasing operation.

Figure 10:
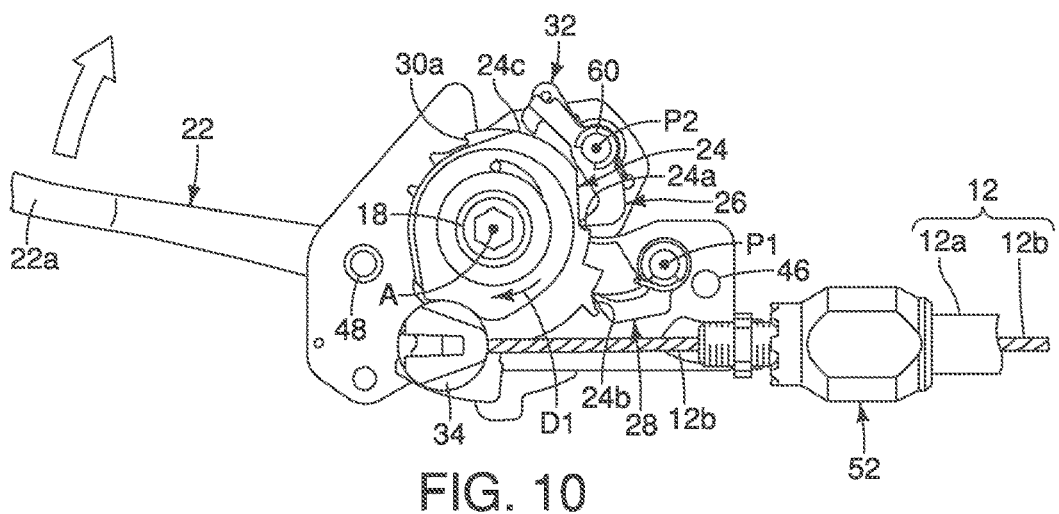
FIG. 10 is a top plan view, similar to FIG. 8, of selected internal parts of the bicycle component operating device of the illustrated embodiment, but in which the operating member has been operated to perform a pulling operation.
Figure 11:
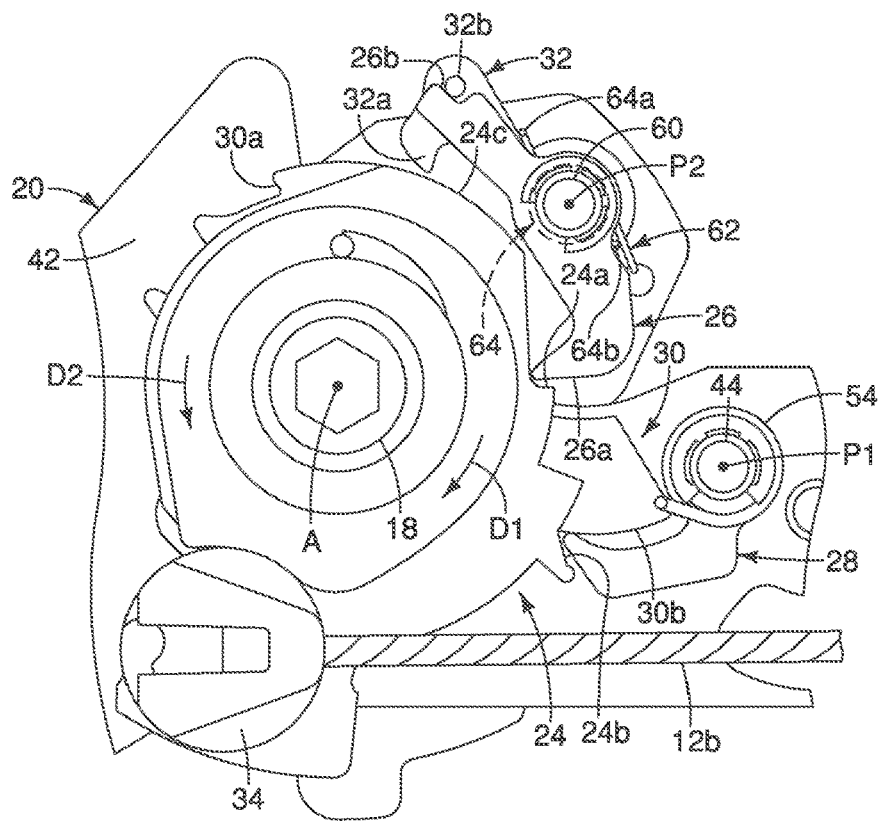
FIG. 11 is an enlarged, partial top plan view of the selected internal parts of the bicycle component operating device illustrated in FIG. 10.

In the illustrated embodiment, the positioning ratchet member 24 is a plate that is rotatably mounted about the pivot axis A. The positioning ratchet member 24 prevents the releasing pawl 32 from rotating the release member 30 while the positioning ratchet member 24 is in the first position as seen in FIGS. 10 and 11. Thus, the release member 30 remains stationary with respect to the base member 20 during a pulling operation. In the illustrated embodiment, the positioning ratchet member 24 includes at least one pulling abutment 24a that is engaged by the pulling pawl 26 during a pulling operation in which the operating member 22 and the positioning ratchet member 24 are moved together in the first direction D1 as seen in FIGS. 10 and 11. In this way, the pulling pawl 26 rotates the positioning ratchet member 24 during a pulling operation. However, the pulling pawl 26 does not rotate the release member 30 during a pulling operation. Rather, the release member 30 remains stationary with respect to the base member 20 during a pulling operation. Moreover, the positioning ratchet member 24 prevents the pulling pawl 26 from rotating the positioning ratchet member 24 while the positioning ratchet member 24 is in the second position as seen in FIGS. 12 and 13. In the illustrated embodiment, the positioning ratchet member 24 includes at least one positioning abutment 24b that is engaged by the positioning pawl 28 while the operating member 22 is in the rest position and the positioning ratchet member 24 is in the second position as seen in FIGS. 12 and 13. In the illustrated embodiment, the positioning ratchet member 24 includes a cam surface 24c that holds the releasing pawl 32 out of engagement with the release member 30 and the positioning ratchet member 24 while the operating member 22 is in the rest position and the positioning ratchet member 24 is in the first position. The cam surface 24c holds the pulling pawl 26 out of engagement with the release member 30 and the positioning ratchet member 24 while the operating member 22 is in the rest position and the positioning ratchet member 24 is in the second position.

The pulling pawl 26 includes a pulling tooth 26a that is configured to engage the pulling abutment 24a of the positioning ratchet member 24 during a pulling operation while the positioning ratchet member 24 is in the first position. The pulling pawl 26 includes a cam surface 26b that holds the releasing pawl 32 out of engagement with the release member 30 while the operating member 22 is in the rest position and the positioning ratchet member 24 is in the first position. In this way, the releasing pawl 32 does not rotate the release member 30 during a pulling operation. The pulling pawl 26 is different from the releasing pawl 32. Thus, the pulling pawl 26 can pivot with respect to the releasing pawl 32 about the pawl pivot axis P2.

The release member 30 is a plate that is rotatably mounted about the pivot axis A. Specifically, the release member 30 is rotatably mounted on the main axle 36. Thus, the release member 30 is movably mounted with respect to the base member 20. The release member 30 is biased in the second direction D2 with respect to the pivot axis A. In particular, the positioning pawl 28 is biased into contact with the release member 30 by the biasing element 54. This biasing force of the biasing element 54 biases the release member 30 in the second direction D2 with respect to the pivot axis A against a stop pin or abutment 42a that is provided on the second support 42.

Figure 14:
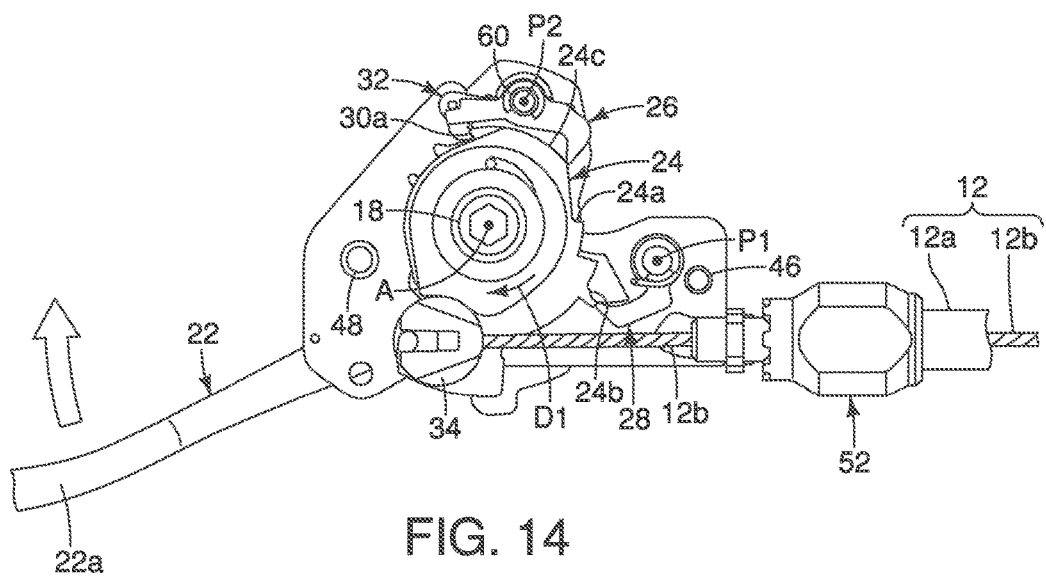
FIG. 14 is a top plan view, similar to FIGS. 8, 10 and 12, of selected internal parts of the bicycle component operating device of the illustrated embodiment, but in which the operating member has been operated to perform a releasing operation.
Figure 15:
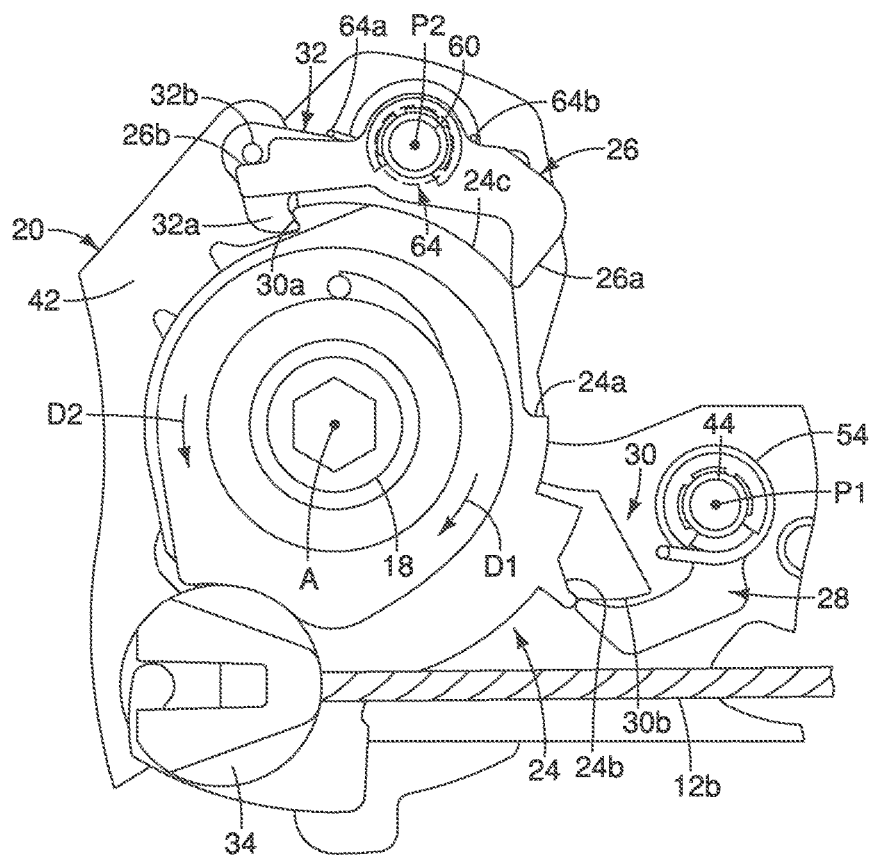
FIG. 15 is an enlarged, partial top plan view of the selected internal parts of the bicycle component operating device illustrated in FIG. 14.

In the illustrated embodiment, the release member 30 includes an abutment 30a that is engaged by the releasing pawl 32 as the operating member 22 moves from the rest position towards the operated position while the positioning ratchet member 24 is in the second position as seen in FIGS. 14 and 15. In other words, the releasing pawl 32 rotates the release member 30 in the first direction D1 with respect to the pivot axis A as the operating member 22 moves from the rest position towards the operated position while the positioning ratchet member 24 is in the second position.

In the illustrated embodiment, the release member 30 includes a cam surface 30b that moves the positioning pawl 28 from the holding position to the releasing position as the operating member 22 moves from the rest position toward the operated position while the positioning ratchet member 24 is in the second position as seen in FIGS. 14 and 15. In particular, the positioning pawl 28 is biased into contact with the cam surface 30b of the release member 30 by the biasing element 54. As a result, movement of the release member 30 will pivot the positioning pawl 28 from the holding position to the releasing position as the operating member 22 moves from the rest position toward the operated position. As a result of the releasing position of the positioning pawl 28, the positioning ratchet member 24 will be rotated in the second direction D2 about the pivot axis A until the first position by the biasing element 56.

Figure 8:
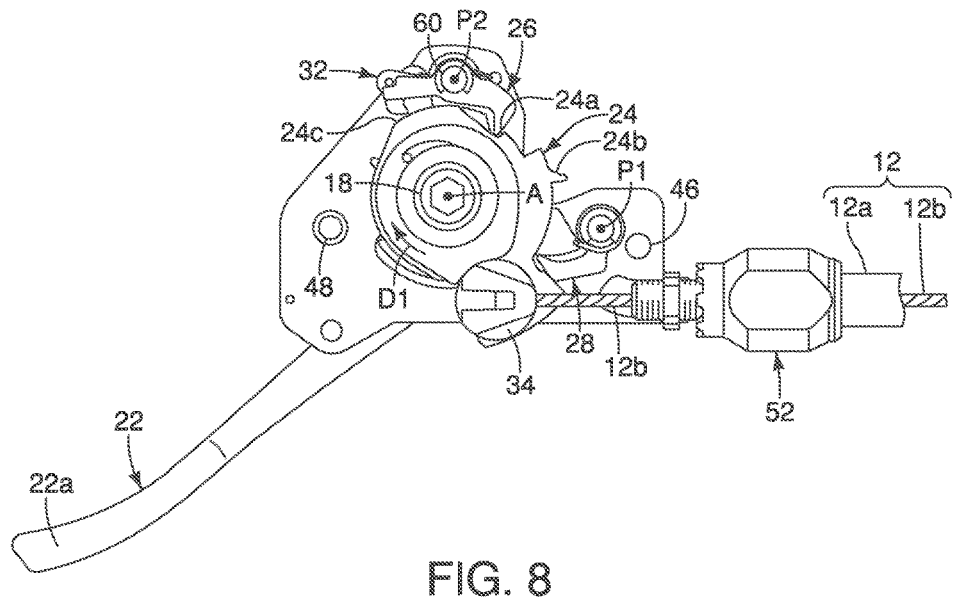
FIG. 8 is a top plan view of selected internal parts of the bicycle component operating device of the illustrated embodiment in which the internal parts are shown in their rest positions and a positioning ratchet member in a first position that corresponds to a fully released position of the positioning ratchet member.
Figure 9:
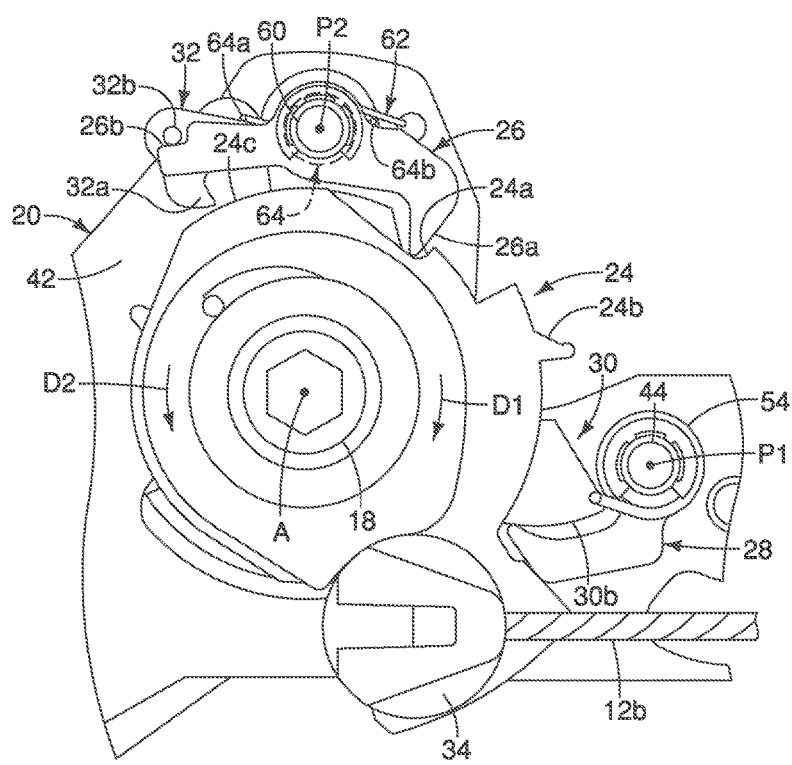
FIG. 9 is an enlarged, partial top plan view of the selected internal parts of the bicycle component operating device illustrated in FIG. 8.

The releasing pawl 32 is pivotally mounted on the operating member 22 about the pawl pivot axis P2. Specifically, the releasing pawl 32 is pivotally mounted on the pivot pin 60. The releasing pawl 32 includes a releasing tooth 32a and a pin or abutment 32b. The releasing pawl 32 is biased towards the engagement with the release member 30. In other words, the releasing tooth 32a of the releasing pawl 32 is biased towards the engagement with the abutment 30a of the release member 30. In the illustrated embodiment, a biasing element 64 is provided for biasing the releasing pawl 32 towards engagement with the release member 30. The biasing element 64 is a torsion spring that has a coiled portion disposed around the pivot pin 60. As seen in FIGS. 9, 11 and 13, the biasing element 64 has a first free end 64a that is operatively coupled to the releasing pawl 32, and a second free end 64b that is operatively coupled to the pulling pawl 26. The releasing pawl 32 is disposed outside a rotational path of the release member 30 while the operating member 22 is in the rest position and the positioning ratchet member 24 is in the first position as seen in FIGS. 8 and 9. On the other hand, the releasing pawl 32 is disposed in a rotational path of the release member 30 while the operating member 22 is in the rest position and the positioning ratchet member 24 is in the second position as seen in FIGS. 12 and 13. In particular, the releasing pawl 32 is provided with the abutment 32b that is biased into contact with the cam surface 26b that holds the releasing pawl 32 out of engagement with the release member 30 while the operating member 22 is in the rest position and the positioning ratchet member 24 is in the first position. In this way, the releasing pawl 32 does not rotate the release member 30 during a pulling operation. However, as seen in FIGS. 12 and 13, while the positioning ratchet member 24 is in the second position, the pulling tooth 26a of the pulling pawl 26 is pivoted away from the pivot axis A by the cam surface 24c of the positioning ratchet member 24, and the cam surface 26b of the pulling pawl 26 is pivoted towards the pivot axis A. As a result, the releasing pawl 32 moves towards the pivot axis A while the positioning ratchet member 24 is in the second position. In this way, the positioning ratchet member 24 prevents the pulling pawl 26 from rotating the positioning ratchet member 24 and the releasing pawl 32 can rotate the release member 30 during a releasing operation. During a releasing operation, the releasing pawl 32 rotates the release member 30. However, the releasing pawl 32 does not rotate the positioning ratchet member 24 during a releasing operation. In this way, the pulling pawl 26 does not rotate the release member 30 during a releasing operation.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component operating device. Accordingly, these directional terms, as utilized to describe the bicycle component operating device should be interpreted relative to a bicycle in an upright riding position on a horizontal surface and that is equipped with the bicycle component operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component operating device comprising:
   a base member;
   an operating member movably mounted with respect to the base member from a rest position toward an operated position;
   a positioning ratchet member rotatably mounted with respect to the base member about a pivot axis between a first position and a second position, the positioning ratchet member being configured to rotate in a first direction and a second direction that is opposite to the first direction;
   a pulling pawl movably mounted on the operating member to move therewith, the pulling pawl being configured to rotate the positioning ratchet member in the first direction about the pivot axis in response to a pulling operation of the operating member from the rest position toward the operated position while the positioning ratchet member is in the first position;
   a positioning pawl movably mounted with respect to the base member between a holding position and a releasing position, the positioning pawl preventing rotation of the positioning ratchet member in the second direction about the pivot axis while the positioning pawl is in the holding position, the positioning pawl releasing the positioning ratchet member for rotation in the second direction while the positioning pawl is in the releasing position;
   a release member movably mounted with respect to the base member; and
   a releasing pawl movably mounted on the operating member to move therewith and to move with respect to the operating member, the releasing pawl being configured to move the release member in response to a releasing operation of the operating member from the rest position toward the operated position while the positioning ratchet member is in the second position, the release member moving the positioning pawl from the holding position to the releasing position in response to the releasing operation, the pulling operation and the releasing operation comprising movements of the operating member in the same direction.

2. The bicycle component operating device according to claim 1, wherein
   the pulling pawl is different from the releasing pawl.

3. The bicycle component operating device according to claim 1, wherein
the operating member is pivotally mounted with respect to the base member about the pivot axis,
the pulling pawl is configured to rotate the positioning ratchet member in the first direction about the pivot axis in response to the pulling operation of the operating member in the first direction while the positioning ratchet member is in the first position, and
the releasing pawl is configured to rotate the release member in the first direction about the pivot axis in response to the releasing operation of the operating member in the first direction while the positioning ratchet member is in the second position.

4. The bicycle component operating device according to claim 1, wherein
the positioning ratchet member prevents the releasing pawl from rotating the release member while the positioning ratchet member is in the first position, and
the positioning ratchet member prevents the pulling pawl from rotating the positioning ratchet member while the positioning ratchet member is in the second position.

5. The bicycle component operating device according to claim 1, wherein
the positioning ratchet member includes an inner wire connection structure.

6. The bicycle component operating device according to claim 1, wherein
the pulling pawl is pivotally mounted on the operating member about a pawl pivot axis.

7. The bicycle component operating device according to claim 6, wherein
the releasing pawl is pivotally mounted on the operating member about the pawl pivot axis.

8. The bicycle component operating device according to claim 1, wherein
the pulling pawl is biased towards engagement with the positioning ratchet member, and
the releasing pawl is biased towards the engagement with the release member.

9. The bicycle component operating device according to claim 8, further comprising
a biasing element having a first free end operatively coupled to the releasing pawl, and a second free end is operatively coupled to the pulling pawl to bias the releasing pawl towards the release member.

10. The bicycle component operating device according to claim 8, wherein
the pulling pawl includes a cam surface that holds the releasing pawl out of engagement with the release member while the operating member is in the rest position and the positioning ratchet member is in the first position, and
the releasing pawl is disposed in a rotational path of the release member while the operating member is in the rest position and the positioning ratchet member is in the second position.

11. The bicycle component operating device according to claim 1, wherein
the positioning ratchet member includes at least one pulling abutment that is engaged by the pulling pawl during the pulling operation in which the operating member and the positioning ratchet member are moved together in the first direction.

12. The bicycle component operating device according to claim 1, wherein
the positioning ratchet member is biased toward the second direction; and
the positioning ratchet member includes at least one positioning abutment that is engaged by the positioning pawl while the operating member is in the rest position and the positioning ratchet member is in the second position.

13. The bicycle component operating device according to claim 1, wherein
the positioning ratchet member and the release member are plates that are rotatably mounted about the pivot axis.

14. The bicycle component operating device according to claim 1, wherein
the release member includes an abutment that is engaged by the releasing pawl as the operating member moves from the rest position towards the operated position while the positioning ratchet member is in the second position.

15. The bicycle component operating device according to claim 1, wherein
the release member includes a cam surface that moves the positioning pawl from the holding position to the releasing position as the operating member moves from the rest position toward the operated position while the positioning ratchet member is in the second position.

* * * * *